(12) United States Patent
Wickland et al.

(10) Patent No.: US 8,566,335 B1
(45) Date of Patent: Oct. 22, 2013

(54) ENTERPRISE SPACE MANAGEMENT AND RESTACKING

(75) Inventors: Mitch Wickland, Atlanta, GA (US); James O'Reilly, Boston, MA (US); Tom Durbin, Charlotte, NC (US); Guy Volz, Charlotte, NC (US); Diana Kutz, San Antonio, TX (US)

(73) Assignee: Bank of America Corporation, Charlotte, NC (US)

( * ) Notice: Subject to any disclaimer, the term of this patent is extended or adjusted under 35 U.S.C. 154(b) by 1035 days.

(21) Appl. No.: 12/126,250

(22) Filed: May 23, 2008

(51) Int. Cl.
*G06F 17/30* (2006.01)
*G06F 7/00* (2006.01)

(52) U.S. Cl.
USPC ............................ 707/758; 707/802; 707/803

(58) Field of Classification Search
USPC .................................................. 707/758, 802
See application file for complete search history.

(56) References Cited

U.S. PATENT DOCUMENTS

| 5,189,606 | A | * | 2/1993 | Burns et al. | 705/10 |
| 2001/0037273 | A1 | * | 11/2001 | Greenlee, Jr. | 705/35 |
| 2006/0233477 | A1 | * | 10/2006 | Thompson | 384/496 |

* cited by examiner

*Primary Examiner* — Kuen Lu
(74) *Attorney, Agent, or Firm* — Banner & Witcoff, Ltd.; Michael A. Springs

(57) ABSTRACT

Methods and systems for performing enterprise space management and for performing building restack operations are provided herein. A space management database system prepares and exports space management data for manual restacking by a user. The database system groups records by zone or by a commonality such as being located within a common divisible location, and exports the data in an editable format, e.g., as a spreadsheet. After a user edits the restack data to indicate a move within an organization's space under management, the data is imported back into the space management database, and then applied against one or more future planning periods to indicate a move of a cost center to or from a location.

20 Claims, 17 Drawing Sheets

FIG. 7

<BofA Logo>
Building Restack Group Listing Form

| Group ID — 703 | Description | Assigned To | No. Buildings | Last Export Date | Last Import Date | # Bldgs NOT in Balance | # Bldgs Pushed to Plan |
|---|---|---|---|---|---|---|---|
| BRG001 | Charlotte | Bill C | 25 | 7/1/2006 | 8/2/2006 | 5 | 10 |
| BRG002 | Florida | John K | 10 | 7/8/2006 | 8/24/2006 | 0 | 5 |
| BRG003 | Texas | john smith | 12 | 7/15/2006 | 9/1/2006 | 6 | 0 |
| BRG004 | Southern California | J Doe | 24 | 9/22/2006 | | | |
| BRG005 | Arizona | Steve S | 14 | 7/16/2006 | 8/17/2006 | 0 | 14 |
| BRG006 | Georgia | Terrell O | 6 | 7/16/2006 | 8/16/2006 | 4 | 2 |
| BRG007 | Northern California | D Bledsoe | 30 | 8/12/2006 | | | |
| BRG008 | Illinois | Vince McM | 18 | 8/24/2006 | | | |
| BRG009 | Manhattan | Aaron N | 4 | 8/25/2006 | | | |
| BRG010 | New | | 0 | | | | |

[ NEW ]  [ CLOSE ]
705
701

FIG. 8

<BofA Logo>  803
Building Restack Group Management Form

| Group ID*: | BRG006 | Last Export Date: | 7/16/06 10:34 | Notes: |
|---|---|---|---|---|
| Group Description: | Georgia | Last Import Date: | 8/16/06 16:15 | |
| Assigned To: | Terrell O | # Bldgs NOT Balanced: | 2 | |
| No. Buildings: | 6 | # Bldgs Pushed to Plan | 2 | |

[SAVE] [CLOSE] [CANCEL] [DELETE]   [EXPORT] [IMPORT]

Building Search and Selection:
State: [Select State ▼]   Site: [Select Site ▼]   Building: [Select Building ▼]   [ADD]

| Select | State | Site Name | Building Name | No. Floors | Calculated Actual | Imported Actual | Difference (Actual) | Plan Start Period | Last Push Date |
|---|---|---|---|---|---|---|---|---|---|
| ☐ | Georgia | SGA1 | GA1-001 | 6 | 60,000 | 57,750 | -2,250 | 07-2007 ▼ | |
| ☐ | Georgia | SGA2 | GA2-001 | 4 | 40,000 | 42,250 | 2,250 | 07-2007 ▼ | |
| ☐ | Georgia | SGA2 | GA3-002 | 7 | 70,000 | 70,000 | 0 | 07-2008 ▼ | 8/18/06 13:15 |
| ☐ | Georgia | SGA3 | GA3-001 | 2 | 20,000 | 18,000 | -2,000 | 08-2008 ▼ | |
| ☐ | Georgia | SGA3 | GA3-002 | 3 | 30,000 | 30,078 | 78 | 07-2007 ▼ | |
| ☐ | Georgia | SGA4 | GA3-001 | 2 | 20,000 | 20,000 | 0 | 07-2007 ▼ | 8/19/06 9:15 |

Push selected Restack Buildings to Plan ----->>> [ PUSH ]
Restore selected Drawing Based Building to Plan ----->>> [ RESTORE ]  807
Remove Building from Building Restack Group ----->>> [ REMOVE ]

805
801

|   | A | B | C | D | H | I | J | K | L | M | N | O |
|---|---|---|---|---|---|---|---|---|---|---|---|---|
| 1 | State | Site | Building | CTIID | Building Rentable SF | Floor | Floor Gross SF | Floor Rentable SF | Total Common SF | Floor Common SF | Building Common SF | Site Common SF |
| 2 | GA | SGA1-006 | GA1-006 | GABANP076 | 579,190 | | | | | | | |
| 3 | GA | SGA1-006 | GA1-006 | GABANP076 | 579,190 | 00P | 35,806 | 32,186 | 16,111 | 7,389 | 8,722 | 0 |
| 4 | GA | SGA1-006 | GA1-006 | GABANP076 | 579,190 | 00P | | | | | | |
| 5 | GA | SGA1-006 | GA1-006 | GABANP076 | 579,190 | 00P | | | | | | |
| 6 | GA | SGA1-006 | GA1-006 | GABANP076 | 579,190 | 00P | | | | | | |
| 7 | GA | SGA1-006 | GA1-006 | GABANP076 | 579,190 | 00P | | | | | | |
| 8 | GA | SGA1-006 | GA1-006 | GABANP076 | 579,190 | 00P | | | | | | |
| 9 | GA | SGA1-006 | GA1-006 | GABANP076 | 579,190 | 00P | | | | | | |
| 10 | GA | SGA1-006 | GA1-006 | GABANP076 | 579,190 | 00P | | | | | | |
| 11 | GA | SGA1-006 | GA1-006 | GABANP076 | 579,190 | 00P | | | | | | |
| 12 | GA | SGA1-006 | GA1-006 | GABANP076 | 579,190 | 00P | | | | | | |
| 13 | GA | SGA1-006 | GA1-006 | GABANP076 | 579,190 | 00P | | | | | | |
| 14 | GA | SGA1-006 | GA1-006 | GABANP076 | 579,190 | 00P | | | | | | |
| 15 | GA | SGA1-006 | GA1-006 | GABANP076 | 579,190 | 00P | | | | | | |
| 16 | GA | SGA1-006 | GA1-006 | GABANP076 | 579,190 | 00P | | | | | | |
| 17 | GA | SGA1-006 | GA1-006 | GABANP076 | 579,190 | 00P | | | | | | |
| 18 | GA | SGA1-006 | GA1-006 | GABANP076 | 579,190 | 00P | | | | | | |
| 19 | GA | SGA1-006 | GA1-006 | GABANP076 | 579,190 | 00P | | | | | | |
| 20 | GA | SGA1-006 | GA1-006 | GABANP076 | 579,190 | 01F | 24,079 | 21,073 | 1,000 | 1,000 | 0 | 0 |
| 21 | GA | SGA1-006 | GA1-006 | GABANP076 | 579,190 | 01F | | | | | | |
| 22 | GA | SGA1-006 | GA1-006 | GABANP076 | 579,190 | 01F | | | | | | |
| 23 | GA | SGA1-006 | GA1-006 | GABANP076 | 579,190 | 01F | | | | | | |
| 24 | GA | SGA1-006 | GA1-006 | GABANP076 | 579,190 | 02F | 24,524 | 21,092 | 1,387 | 1,387 | 0 | 0 |
| 25 | GA | SGA1-006 | GA1-006 | GABANP076 | 579,190 | 02F | | | | | | |
| 26 | GA | SGA1-006 | GA1-006 | GABANP076 | 579,190 | 02F | | | | | | |
| 27 | GA | SGA1-006 | GA1-006 | GABANP076 | 579,190 | 02F | | | | | | |
| 28 | GA | SGA1-006 | GA1-006 | GABANP076 | 579,190 | 02F | | | | | | |
| 29 | GA | SGA1-006 | GA1-006 | GABANP076 | 579,190 | 02F | | | | | | |
| 30 | GA | SGA1-006 | GA1-006 | GABANP076 | 579,190 | 02F | | | | | | |
| 31 | GA | SGA1-006 | GA1-006 | GABANP076 | 579,190 | 02F | | | | | | |
| 32 | GA | SGA1-006 | GA1-006 | GABANP076 | 579,190 | 02F | | | | | | |
| 33 | GA | SGA1-006 | GA1-006 | GABANP076 | 579,190 | 02F | | | | | | |
| 34 | GA | SGA1-006 | GA1-006 | GABANP076 | 579,190 | 02F | | | | | | |
| 35 | GA | SGA1-006 | GA1-006 | GABANP076 | 579,190 | 02F | | | | | | |
| 36 | GA | SGA1-006 | GA1-006 | GABANP076 | 579,190 | 02F | | | | | | |
| 37 | GA | SGA1-006 | GA1-006 | GABANP076 | 579,190 | 02F | | | | | | |
| 38 | GA | SGA1-006 | GA1-006 | GABANP076 | 579,190 | 02F | | | | | | |

FIG. 9A

| P | Q | R | S | T | U | V | W | X | Y | Z |
|---|---|---|---|---|---|---|---|---|---|---|
| Zone | Zone Usable SF | Zone Secondary SF | Total Shared SF | Zone Shared SF | Floor Shared SF | Building Shared SF | Site Shared SF | Bank Shared SF | Zone Code SharedSF | Zone Efficiency Ratio |
|  |  |  |  |  |  |  |  |  |  |  |
| GA1-006-00P-01 | 5,004 | 1,251 | 1,251 | 0 | 1,251 | 0 | 0 | 0 | 0 | 1 |
| GA1-006-00P-01 |  |  |  |  |  |  |  |  |  |  |
| GA1-006-00P-01 |  |  |  |  |  |  |  |  |  |  |
| GA1-006-00P-02 | 3,726 | 0 | 0 | 0 | 0 | 0 | 0 | 0 | 0 | 1 |
| GA1-006-00P-02 |  |  |  |  |  |  |  |  |  |  |
| GA1-006-00P-03 | 2,284 | 1,594 | 1,594 | 0 | 1,594 | 0 | 0 | 0 | 0 | 1 |
| GA1-006-00P-03 |  |  |  |  |  |  |  |  |  |  |
| GA1-006-00P-04 | 1,630 | 1,353 | 1,353 | 0 | 1,353 | 0 | 0 | 0 | 0 | 1 |
| GA1-006-00P-04 |  |  |  |  |  |  |  |  |  |  |
| GA1-006-00P-05 | 778 | 614 | 614 | 0 | 614 | 0 | 0 | 0 | 0 | 1 |
| GA1-006-00P-05 |  |  |  |  |  |  |  |  |  |  |
| GA1-006-00P-06 | 327 | 327 | 327 | 0 | 327 | 0 | 0 | 0 | 0 | 1 |
| GA1-006-00P-07 | 2,003 | 0 | 0 | 0 | 0 | 0 | 0 | 0 | 0 | 1 |
| GA1-006-00P-07 |  |  |  |  |  |  |  |  |  |  |
| GA1-006-00P-08 | 323 | 0 | 0 | 0 | 0 | 0 | 0 | 0 | 0 | 1 |
| GA1-006-00P-08 |  |  |  |  |  |  |  |  |  |  |
|  |  |  |  |  |  |  |  |  |  |  |
| A0A0 | 20,074 | 0 | 0 | 0 | 0 | 0 | 0 | 0 | 0 | 1 |
| A0A0 |  |  |  |  |  |  |  |  |  |  |
| A0A0 |  |  |  |  |  |  |  |  |  |  |
|  |  |  |  |  |  |  |  |  |  |  |
| GA1-006-02-01 | 19,705 | 9,087 | 2,595 | 0 | 2,595 | 0 | 0 | 0 | 0 | 1 |
| GA1-006-02-01 |  |  |  |  |  |  |  |  |  |  |
| GA1-006-02-01 |  |  |  |  |  |  |  |  |  |  |
| GA1-006-02-01 |  |  |  |  |  |  |  |  |  |  |
| GA1-006-02-01 |  |  |  |  |  |  |  |  |  |  |
| GA1-006-02-01 |  |  |  |  |  |  |  |  |  |  |
| GA1-006-02-01 |  |  |  |  |  |  |  |  |  |  |
| GA1-006-02-01 |  |  |  |  |  |  |  |  |  |  |
| GA1-006-02-01 |  |  |  |  |  |  |  |  |  |  |
| GA1-006-02-01 |  |  |  |  |  |  |  |  |  |  |
| GA1-006-02-01 |  |  |  |  |  |  |  |  |  |  |
| GA1-006-02-01 |  |  |  |  |  |  |  |  |  |  |
| GA1-006-02-01 |  |  |  |  |  |  |  |  |  |  |
| GA1-006-02-01 |  |  |  |  |  |  |  |  |  |  |

FIG. 9B

| AA | AB | AC | AD | AE | AF | AG | AH | AI | AJ | AK | AL |
|---|---|---|---|---|---|---|---|---|---|---|---|
| Unit Status | Hierarchy | Co/CC | Number of Spaces | Number of Wkstns | Existing SF as of July 1, 2008 | 2008-07 | 2008-08 | 2008-09 | 2008-10 | 2008-11 | 2008-12 |
| | | | 1060 | 671 | 1,060 | 671 | 407,775 | 407,775 | 456,872 | 456,872 | 456,872 |
| | | | 14 | 1 | 14 | 1 | 10,936 | 10,936 | 10,936 | 10,936 | 10,936 |
| | | | 3 | 0 | 3 | 0 | 3,753 | 3,753 | 3,753 | 3,753 | 3,753 |
| OCC | ABCA...BC | XXX/XXXXXXX | 2 | 0 | 2 | 0 | 677 | 677 | 677 | 677 | 677 |
| OCC | ABCA...BC | XXX/XXXXXXX | 1 | 0 | 1 | 0 | 3,076 | 3,076 | 3,076 | 3,076 | 3,076 |
| | | | 4 | 1 | 4 | 1 | 3,726 | 3,726 | 3,726 | 3,726 | 3,726 |
| OCC | ABCA...BC | XXX/XXXXXXX | 4 | 1 | 4 | 1 | 3,726 | 3,726 | 3,726 | 3,726 | 3,726 |
| | | | 3 | 0 | 3 | 0 | 690 | 690 | 690 | 690 | 690 |
| VRB | ABCA...BC | XXX/XXXXXXX | 3 | 0 | 3 | 0 | 690 | 690 | 690 | 690 | 690 |
| | | | 1 | 0 | 1 | 0 | 277 | 277 | 277 | 277 | 277 |
| OCC | ABCA...BC | XXX/XXXXXXX | 1 | 0 | 1 | 0 | 277 | 277 | 277 | 277 | 277 |
| | | | 1 | 0 | 1 | 0 | 164 | 164 | 164 | 164 | 164 |
| OCC | ABCA...BC | XXX/XXXXXXX | 1 | 0 | 1 | 0 | 164 | 164 | 164 | 164 | 164 |
| | | | 0 | 0 | 0 | 0 | 0 | 0 | 0 | 0 | 0 |
| | | | 1 | 0 | 1 | 0 | 2,003 | 2,003 | 2,003 | 2,003 | 2,003 |
| OCC | 3rd Party | 3rd Party | 1 | 0 | 1 | 0 | 2,003 | 2,003 | 2,003 | 2,003 | 2,003 |
| | | | 1 | 0 | 1 | 0 | 323 | 323 | 323 | 323 | 323 |
| OCC | ABCA...BC | XXX/XXXXXXX | 1 | 0 | 1 | 0 | 323 | 323 | 323 | 323 | 323 |
| | | | 2 | 0 | 2 | 0 | 20,074 | 20,074 | 20,074 | 20,074 | 20,074 |
| | | | 2 | 0 | 2 | 0 | 20,074 | 20,074 | 20,074 | 20,074 | 20,074 |
| OCC | ABCA...BC | XXX/XXXXXXX | 1 | 0 | 1 | 0 | 17,338 | 17,338 | 17,338 | 17,338 | 17,338 |
| OCC | ABCA...BC | XXX/YYYYYYY | 1 | 0 | 1 | 0 | 2,736 | 2,736 | 2,736 | 2,736 | 2,736 |
| | | | 40 | 61 | 40 | 61 | 10,618 | 10,618 | 59,715 | 59,715 | 59,715 |
| | | | 40 | 61 | 40 | 61 | 10,618 | 10,618 | 59,715 | 59,715 | 59,715 |
| VRB | | XXX/XXXXXXX | 1 | 3 | 1 | 3 | 186 | 186 | 186 | 186 | 186 |
| OCC | ABCA...BC | XXX/XXXXXXX | 2 | 0 | 2 | 0 | 903 | 903 | 50,000 | 50,000 | 50,000 |
| VRB | ABCA...BC | XXX/XXXXXXX | 1 | 0 | 1 | 0 | 246 | 246 | 246 | 246 | 246 |
| OCC | ABCA...BC | XXX/XXXXXXX | 1 | 0 | 1 | 0 | 214 | 214 | 214 | 214 | 214 |
| VRB | ABCA...BC | XXX/XXXXXXX | 1 | 10 | 1 | 10 | 753 | 753 | 753 | 753 | 753 |
| OCC | ABCA...BC | XXX/XXXXXXX | 2 | 0 | 2 | 0 | 368 | 368 | 368 | 368 | 368 |
| OCC | ABCA...BC | XXX/XXXXXXX | 1 | 0 | 1 | 0 | 232 | 232 | 232 | 232 | 232 |
| OCC | ABCA...BC | XXX/XXXXXXX | 1 | 0 | 1 | 0 | 231 | 231 | 231 | 231 | 231 |
| VRB | ABCA...BC | XXX/XXXXXXX | 0 | 2 | 0 | 2 | 134 | 134 | 134 | 134 | 134 |
| OCC | ABCA...BC | XXX/XXXXXXX | 1 | 0 | 1 | 0 | 155 | 155 | 155 | 155 | 155 |
| OCC | ABCA...BC | XXX/XXXXXXX | 0 | 1 | 0 | 1 | 67 | 67 | 67 | 67 | 67 |
| OCC | ABCA...BC | XXX/XXXXXXX | 1 | 0 | 1 | 0 | 126 | 126 | 126 | 126 | 126 |
| VRB | ABCA...BC | XXX/XXXXXXX | 0 | 2 | 0 | 2 | 134 | 134 | 134 | 134 | 134 |

FIG 9C

| | AM | AN | AO | AP | AQ | AR | AS | AT | AU | AV | AW | AX | AY |
|---|---|---|---|---|---|---|---|---|---|---|---|---|---|
| | 2009-01 | 2009-02 | 2009-03 | 2009-04 | 2009-05 | 2009-06 | 2009-07 | 2009-08 | 2009-09 | 2009-10 | 2009-11 | 2009-12 | Notes/Reason for Move PROVIDE AS MUCH INFORMATION AS POSSIBLE |
| | 456,872 | 456,872 | 456,872 | 456,872 | 456,872 | 456,872 | 456,872 | 456,872 | 456,872 | 456,872 | 456,872 | 456,872 | |
| | 10,936 | 10,936 | 10,936 | 10,936 | 10,936 | 10,936 | 10,936 | 10,936 | 10,936 | 10,936 | 10,936 | 10,936 | |
| | 3,753 | 3,753 | 3,753 | 3,753 | 3,753 | 3,753 | 3,753 | 3,753 | 3,753 | 3,753 | 3,753 | 3,753 | |
| | 677 | 677 | 677 | 677 | 677 | 677 | 677 | 677 | 677 | 677 | 677 | 677 | |
| | 3,076 | 3,076 | 3,076 | 3,076 | 3,076 | 3,076 | 3,076 | 3,076 | 3,076 | 3,076 | 3,076 | 3,076 | |
| | 3,726 | 3,726 | 3,726 | 3,726 | 3,726 | 3,726 | 3,726 | 3,726 | 3,726 | 3,726 | 3,726 | 3,726 | |
| | 3,726 | 3,726 | 3,726 | 3,726 | 3,726 | 3,726 | 3,726 | 3,726 | 3,726 | 3,726 | 3,726 | 3,726 | |
| | 690 | 690 | 690 | 690 | 690 | 690 | 690 | 690 | 690 | 690 | 690 | 690 | |
| | 690 | 690 | 690 | 690 | 690 | 690 | 690 | 690 | 690 | 690 | 690 | 690 | |
| | 277 | 277 | 277 | 277 | 277 | 277 | 277 | 277 | 277 | 277 | 277 | 277 | |
| | 277 | 277 | 277 | 277 | 277 | 277 | 277 | 277 | 277 | 277 | 277 | 277 | |
| | 164 | 164 | 164 | 164 | 164 | 164 | 164 | 164 | 164 | 164 | 164 | 164 | |
| | 164 | 164 | 164 | 164 | 164 | 164 | 164 | 164 | 164 | 164 | 164 | 164 | |
| | 0 | 0 | 0 | 0 | 0 | 0 | 0 | 0 | 0 | 0 | 0 | 0 | |
| | 2,003 | 2,003 | 2,003 | 2,003 | 2,003 | 2,003 | 2,003 | 2,003 | 2,003 | 2,003 | 2,003 | 2,003 | |
| | 2,003 | 2,003 | 2,003 | 2,003 | 2,003 | 2,003 | 2,003 | 2,003 | 2,003 | 2,003 | 2,003 | 2,003 | |
| | 323 | 323 | 323 | 323 | 323 | 323 | 323 | 323 | 323 | 323 | 323 | 323 | |
| | 323 | 323 | 323 | 323 | 323 | 323 | 323 | 323 | 323 | 323 | 323 | 323 | |
| | 20,074 | 20,074 | 20,074 | 20,074 | 20,074 | 20,074 | 20,074 | 20,074 | 20,074 | 20,074 | 20,074 | 20,074 | |
| | 20,074 | 20,074 | 20,074 | 20,074 | 20,074 | 20,074 | 20,074 | 20,074 | 20,074 | 20,074 | 20,074 | 20,074 | |
| | 17,338 | 17,338 | 17,338 | 17,338 | 17,338 | 17,338 | 17,338 | 17,338 | 17,338 | 17,338 | 17,338 | 17,338 | |
| | 2,736 | 2,736 | 2,736 | 2,736 | 2,736 | 2,736 | 2,736 | 2,736 | 2,736 | 2,736 | 2,736 | 2,736 | |
| | 59,715 | 59,715 | 59,715 | 59,715 | 59,715 | 59,715 | 59,715 | 59,715 | 59,715 | 59,715 | 59,715 | 59,715 | |
| | 59,715 | 59,715 | 59,715 | 59,715 | 59,715 | 59,715 | 59,715 | 59,715 | 59,715 | 59,715 | 59,715 | 59,715 | |
| | 186 | 186 | 186 | 186 | 186 | 186 | 186 | 186 | 186 | 186 | 186 | 186 | |
| | 50,000 | 50,000 | 50,000 | 50,000 | 50,000 | 50,000 | 50,000 | 50,000 | 50,000 | 50,000 | 50,000 | 50,000 | |
| | 246 | 246 | 246 | 246 | 246 | 246 | 246 | 246 | 246 | 246 | 246 | 246 | |
| | 214 | 214 | 214 | 214 | 214 | 214 | 214 | 214 | 214 | 214 | 214 | 214 | |
| | 753 | 753 | 753 | 753 | 753 | 753 | 753 | 753 | 753 | 753 | 753 | 753 | |
| | 368 | 368 | 368 | 368 | 368 | 368 | 368 | 368 | 368 | 368 | 368 | 368 | |
| | 232 | 232 | 232 | 232 | 232 | 232 | 232 | 232 | 232 | 232 | 232 | 232 | |
| | 231 | 231 | 231 | 231 | 231 | 231 | 231 | 231 | 231 | 231 | 231 | 231 | |
| | 134 | 134 | 134 | 134 | 134 | 134 | 134 | 134 | 134 | 134 | 134 | 134 | |
| | 155 | 155 | 155 | 155 | 155 | 155 | 155 | 155 | 155 | 155 | 155 | 155 | |
| | 67 | 67 | 67 | 67 | 67 | 67 | 67 | 67 | 67 | 67 | 67 | 67 | |
| | 126 | 126 | 126 | 126 | 126 | 126 | 126 | 126 | 126 | 126 | 126 | 126 | |
| | 134 | 134 | 134 | 134 | 134 | 134 | 134 | 134 | 134 | 134 | 134 | 134 | |

| | Unit Status | Hierarchy | Co/CC | Number of Spaces | Number of Wkstns | Existing SF as of July 1, 2008 |
|---|---|---|---|---|---|---|
| 2 | | | | | | |
| 14 | | | | 46 | 30 | 10,452 |
| 15 | | | | 46 | 30 | 10,452 |
| 16 | VPC | | xxx/xxxxxxx | 1 | 0 | 211 |
| 17 | OCC | ABCD..AB | xxx/xxxxxxx | 4 | 2 | 710 |
| 18 | OCC | ABCD..AB | xxx/xxxxxxx | 1 | 0 | 211 |
| 19 | VRB | ABCD..AB | xxx/xxxxxxx | 1 | 0 | 962 |
| 20 | OCC | ABCD..AB | xxx/xxxxxxx | 1 | 0 | 211 |
| 21 | OCC | ABCD..AB | xxx/xxxxxxx | 0 | 1 | 71 |
| 22 | OCC | ABCD..AB | xxx/vvvvvv | 8 | 17 | 2,322 |
| 23 | OCC | ABCD..AB | xxx/xxxxxxx | 1 | 0 | 1,077 |
| 24 | OCC | ABCD..AB | xxx/xxxxxxx | 1 | 0 | 142 |
| 25 | VRB | ABCD..AB | xxx/xxxxxxx | 1 | 0 | 211 |
| 26 | OCC | ABCD..AB | xxx/xxxxxxx | 1 | 0 | 139 |
| 27 | OCC | ABCD..AB | xxx/xxxxxxx | 8 | 8 | 1,872 |
| 28 | OCC | ABCD..AB | xxx/xxxxxxx | 3 | 0 | 411 |
| 29 | OCC | ABCD..AB | xxx/xxxxxxx | 4 | 1 | 672 |
| 30 | OCC | ABCD..AB | xxx/xxxxxxx | 11 | 1 | 1,230 |

| 2 | 2008-07 | 2008-08 | 2008-09 | 2008-10 | 2008-11 | 2008-12 | 2009-01 | 2009-02 |
|---|---|---|---|---|---|---|---|---|
| 14 | 10,452 | 10,452 | 10,452 | 10,452 | 10,452 | 10,452 | 10,452 | 10,452 |
| 15 | 10,452 | 10,452 | 10,452 | 10,452 | 10,452 | 10,452 | 10,452 | 10,452 |
| 16 | 211 | 211 | 211 | 211 | 211 | 211 | 211 | 211 |
| 17 | 710 | 710 | 710 | 710 | 710 | 710 | 710 | 710 |
| 18 | 211 | 211 | 211 | 211 | 211 | 211 | 211 | 211 |
| 19 | 962 | 962 | 962 | 962 | 962 | 962 | 962 | 962 |
| 20 | 211 | 211 | 211 | 211 | 211 | 211 | 211 | 211 |
| 21 | 71 | 71 | 71 | 71 | 71 | 71 | 71 | 71 |
| 22 | 2,322 | 2,322 | 2,322 | 2,322 | 2,322 | 2,322 | 2,322 | 2,322 |
| 23 | 1,077 | 1,077 | 1,077 | 1,077 | 1,077 | 1,077 | 1,077 | 1,077 |
| 24 | 142 | 142 | 142 | 142 | 142 | 142 | 142 | 142 |
| 25 | 211 | 211 | 211 | 211 | 211 | 211 | 211 | 211 |
| 26 | 139 | 139 | 139 | 139 | 139 | 139 | 139 | 139 |
| 27 | 1,872 | 1,872 | 1,872 | 1,872 | 1,872 | 1,872 | 1,872 | 1,872 |
| 28 | 411 | 411 | 411 | 411 | 411 | 411 | 411 | 411 |
| 29 | 672 | 672 | 672 | 672 | 672 | 672 | 672 | 672 |
| 30 | 1,230 | 1,230 | 1,230 | 1,230 | 1,230 | 1,230 | 1,230 | 1,230 |

FIG. 11B

| | 2009-03 | 2009-04 | 2009-05 | 2009-06 | 2009-07 | 2009-08 | 2009-09 | 2009-10 | 2009-11 | 2009-12 |
|---|---|---|---|---|---|---|---|---|---|---|
| | 10,452 | 10,452 | 10,452 | 10,452 | 10,452 | 10,452 | 10,452 | 10,452 | 10,452 | 10,452 |
| | 10,452 | 10,452 | 10,452 | 10,452 | 10,452 | 10,452 | 10,452 | 10,452 | 10,452 | 10,452 |
| | 211 | 211 | 211 | 211 | 211 | 211 | 211 | 211 | 211 | 211 |
| | 710 | 710 | 710 | 710 | 710 | 710 | 710 | 710 | 710 | 710 |
| | 211 | 211 | 211 | 211 | 211 | 211 | 211 | 211 | 211 | 211 |
| | 962 | 962 | 962 | 962 | 962 | 962 | 962 | 962 | 962 | 962 |
| | 211 | 211 | 211 | 211 | 211 | 211 | 211 | 211 | 211 | 211 |
| | 71 | 71 | 71 | 71 | 71 | 71 | 71 | 71 | 71 | 71 |
| | 2,322 | 2,322 | 2,322 | 2,322 | 2,322 | 2,322 | 2,322 | 2,322 | 2,322 | 2,322 |
| | 1,077 | 1,077 | 1,077 | 1,077 | 1,077 | 1,077 | 1,077 | 1,077 | 1,077 | 1,077 |
| | 142 | 42 | 142 | 142 | 142 | 142 | 142 | 142 | 142 | 142 |
| | 211 | 211 | 211 | 211 | 211 | 211 | 211 | 211 | 211 | 211 |
| | 139 | 39 | 139 | 139 | 139 | 139 | 139 | 139 | 139 | 139 |
| | 1,872 | 1,872 | 1,872 | 1,872 | 1,872 | 1,872 | 1,872 | 1,872 | 1,872 | 1,872 |
| | 411 | 411 | 411 | 411 | 411 | 411 | 411 | 411 | 411 | 411 |
| | 672 | 672 | 672 | 672 | 672 | 672 | 672 | 672 | 672 | 672 |
| | 1,230 | 1,230 | 1,230 | 1,230 | 1,230 | 1,230 | 1,230 | 1,230 | 1,230 | 1,230 |

FROM FIG. 11B

FIG.11C

| | Unit Status | Hierarchy | Co/CC | Number of Spaces | Number of Wkstns | Existing SF as of July 1, 2008 |
|---|---|---|---|---|---|---|
| 2 | | | | | | |
| 14 | | | | 46 | 30 | 10,452 |
| 15 | | | | 46 | 30 | 10,452 |
| 16 | VPC | | XXX/XXXXXXX | 1 | 0 | 211 |
| 17 | OCC | ABDC...AB | XXX/XXXXXXX | 4 | 2 | 710 |
| 18 | OCC | ABDC...AB | XXX/XXXXXXX | 1 | 0 | 211 |
| 19 | VRB | ABDC...AB | XXX/XXXXXXX | 1 | 0 | 962 |
| 20 | OCC | ABDC...AB | XXX/XXXXXXX | 1 | 0 | 211 |
| 21 | OCC | ABDC...AB | XXX/XXXXXXX | 0 | 1 | 71 |
| 22 | OCC | ABDC...AB | XXX/VVVVVV | 8 | 17 | 2,322 |
| 23 | OCC | | XXX/TTTTTT | | | |
| 24 | VRB | | XXX/RRRRRR | | | |
| 25 | OCC | ABDC...AB | XXX/XXXXXXX | 1 | 0 | 1,077 |
| 26 | OCC | ABDC...AB | XXX/XXXXXXX | 1 | 0 | 142 |
| 27 | VRB | ABDC...AB | XXX/XXXXXXX | 1 | 0 | 211 |
| 28 | OCC | ABDC...AB | XXX/XXXXXXX | 1 | 0 | 139 |
| 29 | OCC | ABDC...AB | XXX/XXXXXXX | 8 | 8 | 1,872 |
| 30 | OCC | ABDC...AB | XXX/XXXXXXX | 3 | 0 | 411 |
| 31 | OCC | ABDC...AB | XXX/XXXXXXX | 4 | 1 | 672 |
| 32 | OCC | ABDC...AB | XXX/XXXXXXX | 11 | 1 | 1,230 |

| | 2009-04 | 2009-05 | 2009-06 | 2009-07 | 2009-08 | 2009-09 | 2009-10 | 2009-11 | 2009-12 |
|---|---|---|---|---|---|---|---|---|---|
| | 10,452 | 10,452 | 10,452 | 10,462 | 10,462 | 10,462 | 10,462 | 10,462 | 10,462 |
| | 10,452 | 10,452 | 10,452 | 10,462 | 10,462 | 10,462 | 10,462 | 10,462 | 10,462 |
| | 211 | 211 | 211 | 211 | 211 | 211 | 211 | 211 | 211 |
| | 710 | 710 | 710 | 710 | 710 | 710 | 710 | 710 | 710 |
| | 211 | 211 | 211 | 211 | 211 | 211 | 211 | 211 | 211 |
| | 962 | 962 | 962 | 962 | 962 | 962 | 962 | 962 | 962 |
| | 211 | 211 | 211 | 211 | 211 | 211 | 211 | 211 | 211 |
| | 71 | 71 | 71 | 71 | 71 | 71 | 71 | 71 | 71 |
| | 0 | 0 | 0 | 0 | 0 | 0 | 0 | 0 | 0 |
| | 1,161 | 1,161 | 1,161 | 2,332 | 2,332 | 2,332 | 2,332 | 2,332 | 2,332 |
| | 1,161 | 1,161 | 1,161 | 0 | 0 | 0 | 0 | 0 | 0 |
| | 1,077 | 1,077 | 1,077 | 1,077 | 1,077 | 1,077 | 1,077 | 1,077 | 1,077 |
| | 142 | 142 | 142 | 142 | 142 | 142 | 142 | 142 | 142 |
| | 211 | 211 | 211 | 211 | 211 | 211 | 211 | 211 | 211 |
| | 139 | 139 | 139 | 139 | 139 | 139 | 139 | 139 | 139 |
| | 1,872 | 1,872 | 1,872 | 1,872 | 1,872 | 1,872 | 1,872 | 1,872 | 1,872 |
| | 411 | 411 | 411 | 411 | 411 | 411 | 411 | 411 | 411 |
| | 672 | 672 | 672 | 672 | 672 | 672 | 672 | 672 | 672 |
| | 1,230 | 1,230 | 1,230 | 1,230 | 1,230 | 1,230 | 1,230 | 1,230 | 1,230 |

FROM FIG. 12B

FIG.12C

ENTERPRISE SPACE MANAGEMENT AND RESTACKING

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to enterprise level management of real estate, office space, and similar inventory. More specifically, the invention provides methods and systems for reorganizing or restacking an organization's workforce within the organization's real estate and space under management.

BACKGROUND OF THE INVENTION

When an organization has under 10,000 square feet (sf) of office space, a single individual can typically manage the space, often without any technical assistance. For example, the individual can manage the space and who is working in various areas of the space using something as simple as a notepad our handwritten ledger. However, large corporations and other large organizations often have hundreds of thousands of square feet of office space, or more, to house their organization's employees, retail or consumer facing operations, corporate management, divisions, and other support infrastructure. Some large organizations have as much as two billion square feet or more of real estate and/or space under management. Naturally, when so much office space is under management, it becomes difficult, if not impossible, for an individual or individuals to manage the office space without technical assistance.

As a result of this need for automated management tools, software tools have been developed to help manage office space. One known software application, CenterStone Software by Manhattan Software, Inc. of Milford, Mass., provides a set of space management tools focused on spatial management of the workplace. These tools include tools for how space is planned (from planning through commissioning), utilized, changed (MAC: moves/adds/changes), owned (or leased) and analyzed and the assets that are associated with each space. More information is available at www (dot) centerstonesoft (dot) com.

However, because of inherent limitations and the limited capabilities of known solutions, it is very difficult and tedious, although not impossible, to develop theoretical models of future occupancy driving higher utilization of space involving moving a subset of an organization's employees from one location to another, either within the same building or another, also known as restacking. That is, when a division or department moves locations, e.g., from one floor of a building to another, or to an entirely new building or location, the space management software or database must be updated to reflect the new location(s) of the relevant division(s), department(s), employee(s), etc. There is presently no convenient way to do this other than by selecting each individual atomic location (i.e., office, conference room, cubicle, and/or workstation), and reassigning each atomic location from one subdivision of the organization to another, or to release the locations due to the organization no longer using that location.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, an aspect of the present invention provides a method for restacking space management data, such as building data. To prepare the data for export, a space management database groups records corresponding to atomic locations based on a commonality of location (and optionally further based on financial assignment, departmental assignment, and/or occupancy status of each atomic location). The restack data is exported for restacking by a user, e.g., the user manually edits the data in spreadsheet format to indicating one or more moves within the organization's space under management. The edited restack data is then reimported back into the space management database and applied against one or more planning periods for one or more locations as defined by the edited restack data.

For example, a user can add or delete rows in the spreadsheet to add or remove cost centers from a building, a floor of a building, and/or a zone on a floor of a building. The user can further edit the square footage used by a cost center by planning period, e.g., monthly, to indicate when during a given year a move is scheduled or will occur. A user can also split existing square footage by adding a new row and dividing the square footage between of an existing row between the existing row and the new row, for one or more planning periods.

Another aspect of the invention automates the aforementioned method by storing computer executable instructions on a computer readable storage medium that are readable and executable by a processing system (the user edits are still performed manually, however, by the user editing the spreadsheet data using a program such as Microsoft® Excel®.).

Another aspect of the invention provides a data structure stored on one or more computer readable storage media, where the data structure is usable for expediting a building restack process. The data structure includes at least four hierarchically nested rows each storing data corresponding to a building, a floor, a zone, or a cost center. Each row corresponding to a building corresponds to one or more nested rows corresponding to a floor. Each row corresponding to a floor corresponds to one or more nested rows corresponding to a zone. At least one row corresponding to a zone corresponds to one or more nested rows corresponding to a cost center. At least each row corresponding to a cost center includes multiple planning period data fields, each corresponding to a different restack period of a planning year. The multiple planning period data fields include one planning period data field per restack period.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 5, illustrates a data flow and schematic methodology for performing building restacking according to one or more aspects of the invention.

FIG. 7 illustrates Building Restack Group Listing Form user interface according to one or more aspects of the invention.

FIG. 8 illustrates a Building Restack Group Management Form user interface according to one or more aspects of the invention.

FIGS. 9A-9D, collectively FIG. 9, illustrate sample spreadsheet data exported according to one or more aspects of the invention.

FIG. 10 illustrates edited data from FIG. 9 according to one or more aspects of the invention.

FIGS. 11A-11C, collectively FIG. 11, illustrates sample spreadsheet data, different form the data illustrated in FIGS. 9 and 10, according to one or more aspects of the invention.

FIGS. 12A-12D, collectively FIG. 12, illustrates edited data from FIG. 11 according to one or more aspects of the invention.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

By way of introduction, the following terms are used herein in the following manner Organization/Enterprise: any group or entity of any kind that rents, leases, owns, or otherwise uses real estate for purposes to further the goals of the organization/enterprise. Organizations/enterprises may include corporations, associations, firms, businesses, charities, hospitals, educational institutions, clubs, groups, or any other association of multiple people for a common goal.

Portfolio/Space Under Management: the total real estate, inclusive of office space residing on the real estate, that an organization uses and/or has control over.

Subdivision: any subset of an organization that is characterized by a common goal or purpose. Subdivisions may include departments, divisions, groups, subsidiaries, teams, and the like.

Atomic location: any location which cannot be divided into further locations. For example, offices, workstations, cubicles, and conference rooms may be considered atomic locations, whereas floors, building wings, buildings, and campuses would not be considered atomic locations.

Divisible location: any location which can be further divided into smaller divisible or atomic locations. For example, floors, building wings, buildings, and campuses would be considered divisible locations, whereas offices, workstations, cubicles, and indivisible conference rooms would not be considered divisible locations. Divisible locations include all the divisible locations and atomic locations underneath them. For example, a building includes further divisible locations, i.e., each floor of the building, and also includes each atomic location within each floor of that building.

Zone: An area of useable square footage on an individual floor with a unique usage, type, and/or tenant. Any floor must include at least one zone but a single floor can include multiple zones.

Restack/Restacking: the process or activity of reorganizing one or more divisible locations within an organization's space under management.

Figure 1:
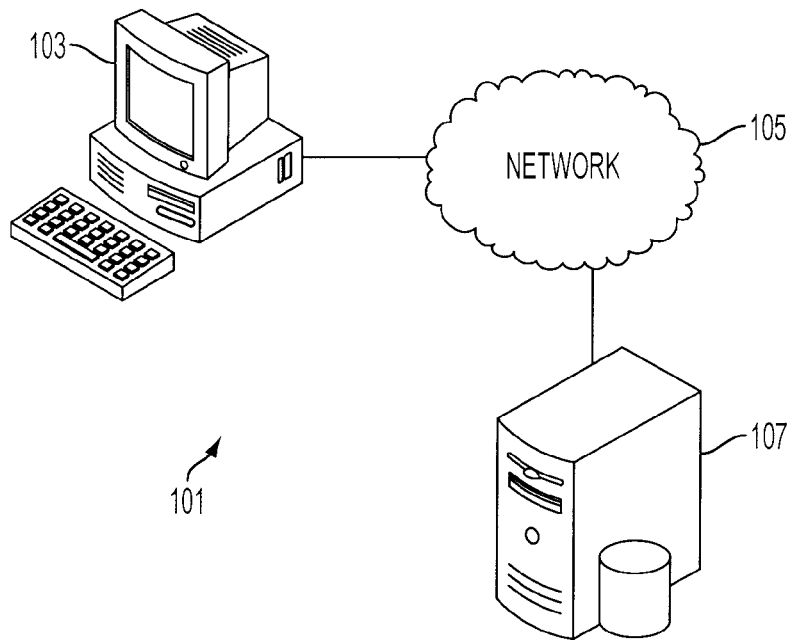
FIG. 1 illustrates a system architecture according to one or more illustrative aspects of the invention.

Aspects of the invention may be used to reassign/restack an organization's employees, members, and/or subdivisions from one divisible location to another. One or more aspects of the invention may be implemented in a system architecture 101 such as that illustrated in FIG. 1 (other system architectures may of course be used). In FIG. 1, a client computer 103 connects via a network 105 with a space management database or database server 107. Client computer 103 may be any known or conventional data processing device now known or developed in the future, such as a desktop computer, laptop or other portable device, and the like. Network 105 may be a public or private network such as the Internet, corporate intranet, local area network, wide area network, personal area network, and the like, or a combination of multiple networks using appropriate security and authentication technologies to control access to space management information and data. Space management database 107 stores all location data for space management purposes for one or more organizations, e.g., indicating which subdivision(s) use which atomic and/or divisible locations. For illustrative purposes, the following examples are limited to space management for a single organization. Alternative system architectures may be used, and the space management database 107 may be included or stored within a memory of computer 103.

One or more aspects of the invention may be embodied in computer-usable data and computer-executable instructions, such as in one or more program modules, executed by one or more computers or other devices. Generally, program modules include routines, programs, objects, components, data structures, and the like that perform particular tasks or implement particular abstract data types when executed by a processor in a computer or other device. The computer executable instructions may be stored on a computer readable medium such as a hard disk, optical disk, removable storage media, solid state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Figure 2:
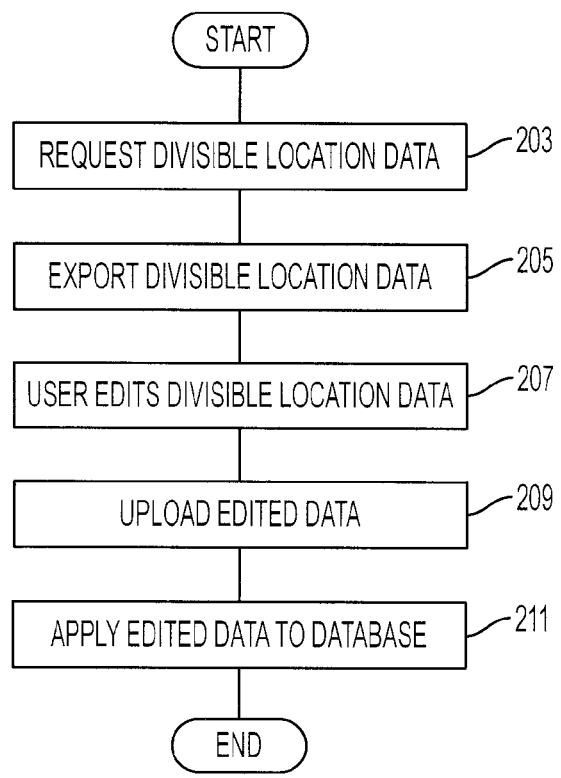
FIG. 2 illustrates a method for reorganizing an enterprise's workforce according to one or more illustrative aspects of the invention.
Figure 3:
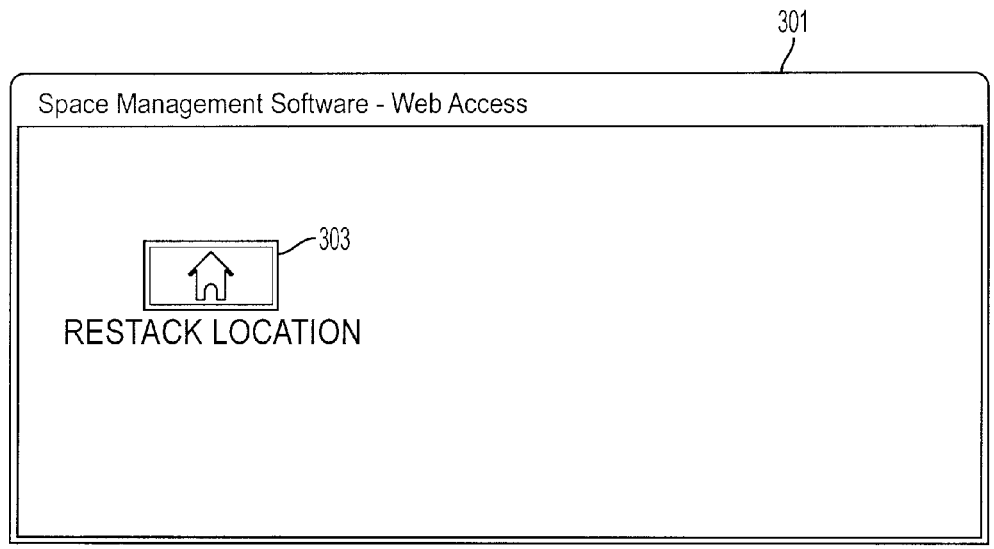
FIG. 3 illustrates a sample web page that may be used with one or more aspects of the invention.

Using the above system architecture or another system architecture, an individual may perform space management using a method similar to that illustrated in FIG. 2. FIG. 2 specifically illustrates a method for restacking real estate by moving a subdivision of an organization from one divisible location to another. In step 201, a user requests or indicates a desire to restack a particular location or to move a subdivision from one location to another. With reference to FIG. 3, this request may include the user selecting an option 303 on a web page 301 through which the user performs space management. As a result of the user request, in step 203 database server 107 parses the space management data, combines atomic locations into their respective divisible locations, and exports the data in the divisible location format. That is, atomic locations are rolled up and grouped into their respective divisible locations, and exported at the divisible location level. Alternatively, the data may instead be rolled up into zones rather than into atomic locations. Each zone may include one or more atomic locations, which may be edited by the user once exported. The data may be exported in any editable format, e.g., as a spreadsheet, XML document, and the like, and may include data corresponding to each rolled up/grouped divisible location, as further illustrated below.

In step 205 a user edits the divisible location information, e.g., by reassigning subdivision codes for one or more divisible locations in the data set. The user uploads the edited data back to the space management database 107 in step 207, and in step 209 the space management database updates divisible locations, and atomic locations within the edited divisible locations, with the new subdivision information, along with any other information edited by the user. The method illustrated in FIG. 2 provides a general overview of the inventive method, which is discussed in more detail below with reference to specific embodiments and illustrative aspects of the invention.

According to aspect of the invention, Manhattan Software's CenterStone software may be used to export data regarding space management and facility usage into a spreadsheet format. The spreadsheet format may subsequently be used to restack a building or multiple buildings, or a subset of a building within the organization's portfolio. The restacking by spreadsheet allows the organization to model future space assignments and prospectively allocate financial resources by subdivision, by including future time periods in the spreadsheet by which the organization can allocate space. In one example, the spreadsheet might include monthly data for a fiscal year, thereby allowing the organization to move a subdivision from one divisible location to another divisible location in the middle of the fiscal year, as further described below.

Figure 4:
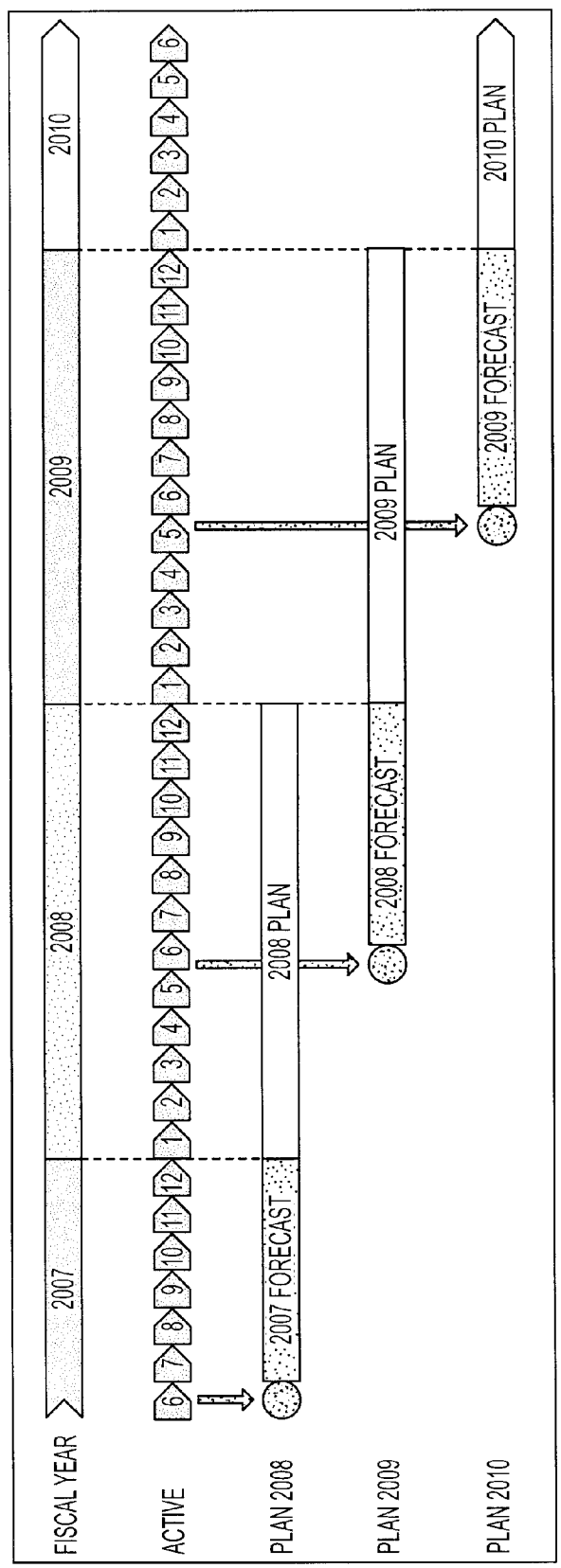
FIG. 4 illustrates a timeline for performing building restacking according to one or more aspects of the invention.

With reference to FIG. 4, there is a defined process that may be followed for the creation, configuration, management and use of a Planning Database for a given year. A Planning Database is created to correspond to a fiscal year, and there is preferably only one Planning Database per fiscal year. Planning Databases are created from a snapshot of an Active Database at some time prior to the commencement of the Planning Database fiscal year. For example, if the Planning Database is created six months in advance of a fiscal year, there would be a total of 18 plan periods within the Planning Database for that fiscal year, i.e., one month for each month leading up to the fiscal year being planned, and one month for each month in the fiscal year being planned. FIG. 4 illustrates the lifecycle of a Planning Database along with the overlap between Planning Databases.

Figure 5A:
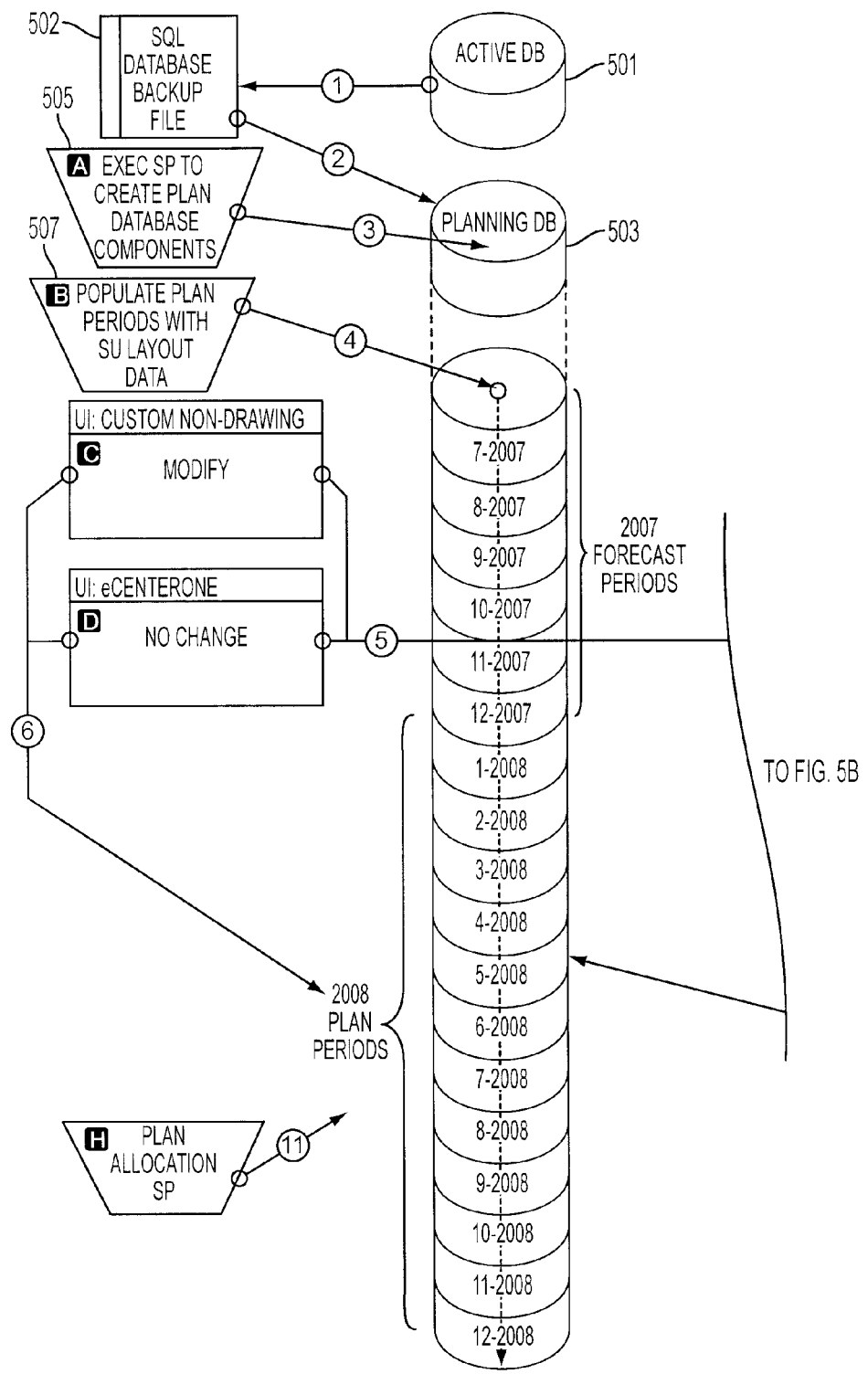
FIGS. 5A and 5B, collectively
Figure 5B:
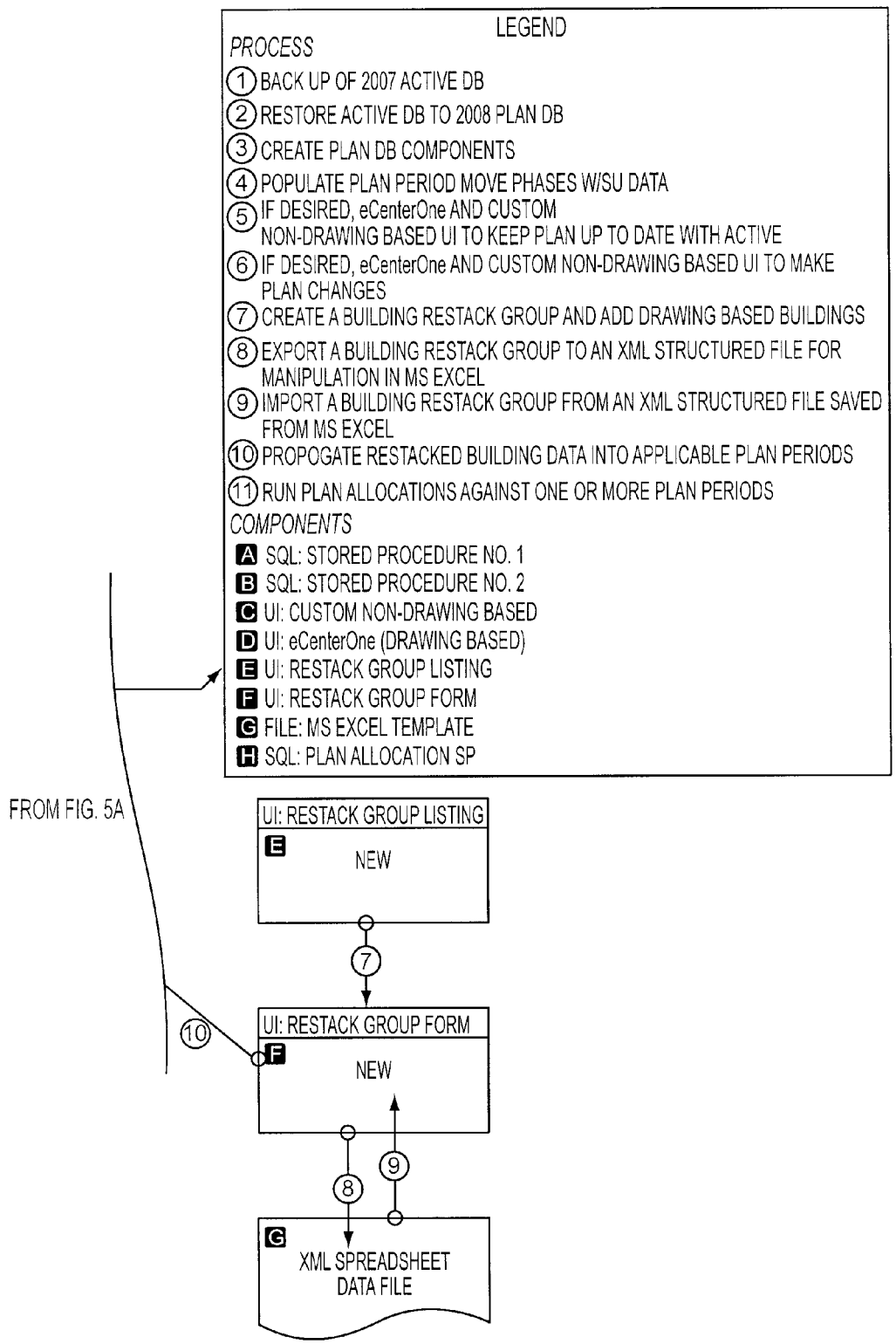

The process of creating, configuring, managing and using a planning database will now be described with reference to FIGS. 5A-5B, referred to together as FIG. 5. The 2008 Plan year is used for illustrative purposes within the diagrams and explanations provided herein. Initially, in step 1, a backup 502 of the active database 501 is created. In step 2, the backup database 502 is copied/restored as a Planning Database 503.

Once the backup 502 of the Active Database 501 is restored to the new Planning Database 503, the As Built in the Planning Database contains the basis for the plan. The "As Built" refers to the Active Database, and includes the data representing the current space allocation for the organization, i.e., which subdivision(s) is/are located in each divisible and/or atomic location, zone, and the like. That is, the active database contains data only up to but not including the fiscal year for which the planning database will be used. In step 3 the system runs a Stored Procedure 505 against the Planning Database 503 to create the Plan Periods. Stored Procedure 505 checks the name of the Database that it is being run against and makes sure it meets any applicable naming conventions to prevent being run against the wrong database.

The stored procedure 505 then generates the 18 Periods as "Move Phases" within the Planning Database 503 (i.e., 07-2007 thru 12-2008, in this example). A "move phase," "planning period," or "restack period" as used herein refers to an allocatable period of time for budgeting and allocation. That is, any specific subdivision of the organization may have distinct space and financial allocations as defined by each particular move phase based upon the corresponding locations and atomic locations assigned and captured in that specific Move Phase defined for the database. Thus, in this example each Move Phase is one month. However, in other embodiments the Move Phase may be defined as one week, two weeks, ½ month, 2 months, and the like. A move is then considered to occur at the end of one Move Phase and prior to the next Move Phase.

Once the applicable plan periods/move phases have been created, in step 4 the system populates each plan period with applicable layout data in order to infer initial allocations from the As Built within any of the Plan Periods and to accept Planning changes without having to make changes to each period individually. That is, because a planning change impacts the period that has been changed as well as all the subsequent Periods, in step 4 the system populates each plan period with the initially inferred information. The Stored Procedure 507 that populates the plan periods identifies buildings that have not already been populated in each of the plan periods so that the Stored Procedure 507 can be started and stopped at will.

While the SP 507 may be started and stopped at will, according to one embodiment all currently operational buildings must be propagated before the system is ready to use. Stated another way, propagation might be required to be complete before manipulation of individual buildings can begin. The measurements calculations computing common areas, shared space square footage and final allocated square footage are copied after all operational buildings and their associated floors are propagated to the plan periods.

The first six periods following the As Built in the Planning Database may be intended to capture reactive restacks as well as other major changes that would impact the following plan periods like new building acquisitions or disposals. The last twelve periods following the Forecast Periods in the Planning Database are not different from the prior Forecast Periods in that all subsequent Plan Periods take on the information from the prior period unless a change has been made. These Twelve Periods may be used as the basis for an annual occupancy budget and, once established, may be compared to actual occupancy once that occupancy period is realized. For the purpose of clarity, all 18 Periods are referred to as Planning Periods. The distinction between the two subsets of Periods is made for illustrative purposes only and not because there is necessarily any difference between any of the 18 Plan Periods in this example.

Prior to exporting the data to spreadsheet format for restacking, the following rules apply when adding, removing and maintaining Sites and Buildings within the Planning Database:

ADD: A site or building may only be added to the As Built. When one is added, it is propagated to the 18 plan periods.

MODIFY: When any attribute or User Defined Attribute on a site or building changes, it is propagated to all subsequent planning periods.

Example 1: If a change is made to an AB site, then the change is propagated to all 18 periods.

Example 2: If a change is made to a building in Period 7, then the change is propagated to the subsequent plan periods (8-18).

Example 3: When a building is changed from non-operational to operational in the As Built, the building is propagated to all plan periods where applicable.

DELETE: Sites and buildings should never be deleted. The system should identify buildings as "non-operational" or similar for the plan periods in which the building should not be used.

MEASUREMENTS: In addition, the measurements calculations computing common areas, shared space square footage and final allocated square footage are run on the affected periods for the site or building in question.

OFFLINE IMPORTS (site and building): Offline imports follow the same rules as above. The organization preferably uses offline imports sparingly because any existing buildings that are imported may delete all changes made in plan. The organization should use offline imports preferably to add sites and buildings to the plan portfolio. During the planning process, a propagated building should not be changed to a different site.

INITIAL DATA PROPAGATION: When the planning DB is setup, this will continue to work as designed in the Functional Specification; that means all operational buildings will be propagated. Any non-operational buildings will not. If a building is changed from non-operational to operational afterwards, then the propagation stored procedure will take over (see MODIFY above) and the building will be propagated to all periods.

Prior to exporting the data to spreadsheet format for restacking, the following rules apply when adding, removing and maintaining Floors within the Planning Database:

ADD: A drawing-based floor can only be added to the As Built. When one is added, it is propagated to the 18 plan periods. For the period one wants the floor to be active, add the drawing to the floor for the period in question. The drawing will be propagated to the subsequent move phases. For non-drawing based buildings, floors can be added to any plan period through the non-drawing based UI. Any floors without drawings will be absent from plan allocations.

MODIFY: Same concept as Sites and buildings.

DELETE: Floors can be deleted from any plan period. When they are, they will be deleted from all subsequent plan periods.

Using the above features, in step 5 a user may make modifications to the planning database to keep the planning database up to date based on changes to the active database (i.e., actual changes to space allocation that may affect the planning period). In step 6, the user(s) may make modifications to the planning database to make plan changes, i.e., changes to the plan for the fiscal year for which the planning database was created. Step 6 contemplates making changes to the planning database using the user interface of the enterprise real estate software. However, beginning at step 7, another aspect of the invention allows for restacking by editing an exported data file, then reimporting the restacked data back into the planning database.

In one embodiment, an organization may use commercially available spreadsheet software as the primary tool for restacking building(s). In step 7 the organization identifies the building(s) to be restacked and in step 8 exports the data from the enterprise real estate software to a structured XML file for manipulation as a spreadsheet. Because in practice it is expected that approximately 200 buildings or more may be restacked during a typical planning cycle, and due to the fact that restacks typically are assigned to planning personnel based on region and potential complications that could arise during the import of a manually manipulated file, the concept of building restack groups may be used. A building restack group is simply a group of buildings that are exported/imported to/from the spreadsheet format together. The building restack groups replace the practice of "parsing" a spreadsheet file into separate spreadsheet files for manipulation by various planning personnel. Following are two user interfaces that are included within a building restack management console. The building restack console may be used by any planning personnel or administrator of the organization.

The organization's planning administrator may create one or more building restack groups, which can each be reviewed in a new building restack group list user interface. Once one or more building restack groups is/are created, one or more buildings may be added to each group, also in step 7. The addition of a building to a building restack group may initiate the population of the building restack tables from building information stored in the As Built portfolio aggregated by Floor, Zone, Occupancy Status and Company Cost Center. The process of adding a building to a building restack group should not impact the As Built or any of the planning periods. A building preferably cannot be included in more than one building restack group.

Next, in step 8, any of the organization's planning administrator can export a building restack group to a structured XML file. The export of building restack groups may be initiated independently of one another, or in a batch, and the date of the last export is stored with each building restack group. The structure and format of the exported file should conform to a format usable by the spreadsheet software (or other software) through which the file will be manipulated to define the restacking of the properties defined in the file. A dialog box presented during the export process may allow the planning administrator to save the export file to a location of his or her choosing.

The organization's planning administrator may distribute the export file to the appropriate planning partner for restack. That is, because the process of restacking a building involves the manipulation of existing departmental assignments (designated in various Figures as "Co/CC") and occupancy status combinations over the 18 Plan Periods, the planning partner (e.g., an individual from the subdivision(s) affected by the restack) may be in the best position to perform all or part of the restack. New departmental assignments and occupancy status combinations can be created within zones and then can be removed. However, Buildings, Floors, Common Areas, Shared Areas and Zones should not be altered or removed, because changing these aspects will impact key elements of the measurement calculations computing common areas, shared space square footage and final allocated square footage.

In step 9, after the spreadsheet has been edited to reflect the desired restacking, the organization's planning administrator retrieves the spreadsheet file(s) from the planning partners and saves it/them to the appropriate XML format to import back into the enterprise real estate software building restacking tables. The import process may verify that any existing zones included in the original export are included in the import file without any new ones being present. Should there be zones missing or extra ones present, these zones are identified and logged and the import might not be committed. In addition to the zone validation, Company and Cost Center (Co/CC) assignment and occupancy status values may be validated at the time of import as well.

In step 10 the system imports the building restack data back into the enterprise real estate software via the building restack group management console, and propagates the data into the applicable planning periods. The building restack group user interface may compare calculated totals versus imported totals on a building by building basis. Based on how accurate the data is following manual restack within the spreadsheet, the organization planning administrator may choose to re-export the building restack group to the spreadsheet for further correction and re-import. That is, the import process might not require square footage to be correct.

Figure 6:
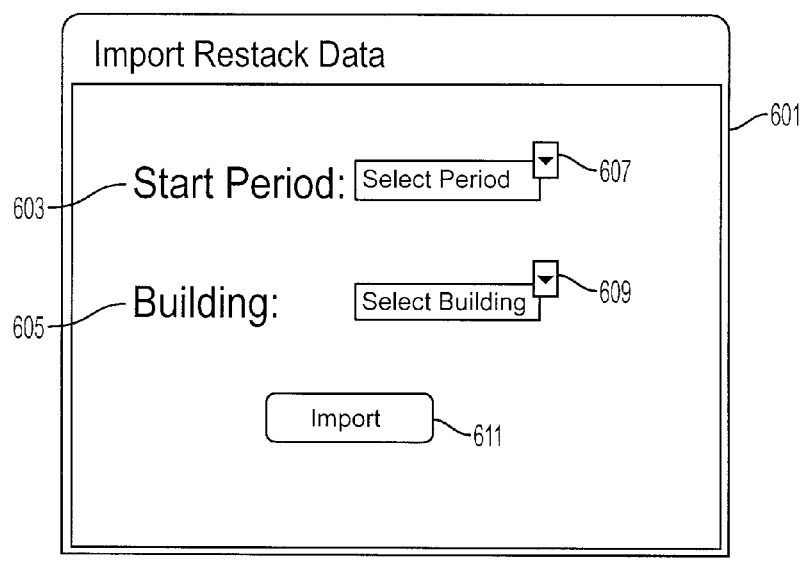
FIG. 6 illustrates a sample user interface according to one or more aspects of the invention.

Propagating the restack information to the appropriate planning periods begins with the selection of a "Start Period." For example, with reference to FIG. 6, a user may use user interface 601 to select applicable planning periods and import the restack data from the spreadsheet file. The user selects the start period 603 and building(s) 605 using input controls 607, 609, respectively. Each input control 607, 609 may include a drop down list, radio button(s), calendar, text entry box, or the like, as desired. Using user interface 601 a "Start Period" 603 is specified for each building 605 included in a building restack group. The "start period" designates the initial period that the buildings are replaced with restacked information. All subsequent periods to the "start period" are then populated with the restack data. For Example, a "Start Period"=01-2008 for a building means that Periods 07-2007 through 12-2007 will contain the old information and Periods 01-2008 thru 12-2008 are populated with the restacked data. One or more buildings can then be "pushed" to the planning periods at a time upon user activation of import control 611.

Validation of the restack data may be performed during the "Push" of restack data to the planning periods. For example, each aggregate space should have a valid Company and Cost Center assignment and occupancy status. Errors may be logged and the restack information might not be committed if one or more errors occur. The process of pushing restack data into the "Start Period" and all subsequent Periods involves clearing structural unit information—existing floors, zones, spaces—and recreating the necessary objects based on the restack information. Once a restacked building has been pushed to one or more planning periods, the building preferably cannot be moved to a different building restack group.

Finally, in step 11, the system determines the space allocation measurements based upon the restacked data now stored in one or more planning periods. Additional aspects of the invention are described in further detail below.

With reference to FIG. 7, window 701 may be used to add/edit building restack groups. For example, a user may select a Group ID 703 to edit the buildings included within the selected group, or may select NEW button 705 to add a new building restack group. Each building restack group may include identification of each building within that group, a description of the group, and an indication of the person responsible for restacking the group, among other information. The remaining information shown in window 701 may be calculated from or based on the data associated with each particular group.

The building restack group window 701 may be accessed from a link on an intranet or managed web page of the organization that is presented to the user following authentication. Form 701 lists all the building restack groups and may be administered by one or more persons, e.g., the organization's planning administrator. The form 701 may include a grid of information that can be scrolled once the list exceeds a visible number of records. Each column is sortable by clicking on the column header, alternating between ascending and descending sort each time clicked. Records can only be sorted by a single column at a time.

Editing a group or adding a new group may be performed using a user interface similar to window 801 shown in FIG. 8. The building restack group management form 801 may be used to manage the restack process for a subset of buildings. Form 801 may include at least three distinct sections; 1) the building restack group metadata and operations section 803, 2) the building search, selection and assignment section 805, and 3) the building restack operation section 807. The data grid that contains assigned buildings may grow to a predetermined number of records and then scroll beyond those records.

The Group ID may be a system defined unique index value. Group Description is a description of the group entered by a user. Assigned To represents the person or group responsible for the restack of that group. No. Buildings is a system calculated value based on buildings assigned to that building restack group. The "# Bldgs NOT Balanced" represents the total number of buildings in the group where the calculated actual total does not equal the imported actual total. The "# Bldgs Pushed to Plan" represents the total number of buildings where the "Last Push Date" field is not blank. Plan Start Period represents the first plan period where restack data will be pushed to when the data is imported from the spreadsheet. Other fields are self-explanatory.

Various controls on form 801 may be used to perform various functions. SAVE button may save the building restack group for future use. CLOSE button may close the form 801 while saving any edits. CANCEL button may close the form 801 without saving any edits. DELETE button may delete the building restack group. Upon activation of the EXPORT button, the system generates and exports a file usable by an external spreadsheet program, as described herein, e.g., as performed by step 8, above. Activation of IMPORT button results in a user query for a file location, and then imports the edited spreadsheet file containing the restack information. Activation of the PUSH button results in the restack data for one or more selected Buildings to be copied to the applicable planning periods. Activation of RESTORE button causes buildings that have been restacked and pushed to planning periods to be restored to the original non-restack data stored in the As Built or subsequent periods containing changes. Activation of the REMOVE button causes selected buildings to be removed from a building restack group if they have not yet been pushed to the planning periods. Buildings that have restacked data pushed to planning periods can be restored and then removed, if desired. In some embodiments, a building can only belong to a single building restack group.

In one embodiment of the invention, the spreadsheet format used complies with the commercially available spreadsheet software. The file that is exported from the building restack group management console may be saved as an XML spreadsheet, which is then readable and usable by the spreadsheet software. The XML file is then used by planning partners to perform building restacks. The structure of the data columns and rows may be defined as shown in tables 1 and 2, below.

TABLE 1

Definition of Data Columns

| Name | Format | For Reference (R), Indexing(I), or Data Entry(DE) | Visible (V) or Hidden (H) | Calculated SUMS in Summation Rows* | Comments |
|---|---|---|---|---|---|
| State | Text | R | V | N | |
| Site | Text | R | V | N | |
| Building | Text | R | V | N | |
| CTI/ID | Text | R | V | N | |
| Complex Name | Text | R | V | N | |
| Address | Text | R | V | N | |
| City | Text | R | V | N | |
| Building Rentable SF | Text | R | V | N | |
| Floor | Text | R | V | N | |
| Floor Gross SF | Text | R | V | N | |
| Floor Rentable SF | Text | R | V | N | |
| Floor Common SF | Text | R | H | N | |
| Building Common SF | Text | R | H | N | |
| Site Common SF | Text | R | H | N | |
| Total Common SF | Text | R | V | N | |
| Zone | Text | I | V | N | Rows added to the spreadsheet must have a valid Zone specified |
| Zone Usable SF | Text | R | V | N | |
| Zone Secondary SF | Text | R | V | N | |
| Zone Shared SF | Text | R | H | N | |
| Floor Shared SF | Text | R | H | N | |
| Building Shared SF | Text | R | H | N | |
| Site Shared SF | Text | R | H | N | |
| Bank Shared SF | Text | R | H | N | |
| Zone Code Shared SF | Text | R | H | N | |
| Total Shared SF | Text | R | V | N | |
| Zone Efficiency Ratio | Number (2d) | R | V | N | |
| Number of Spaces | Number (0d) | R | V | Y | |
| Number of Wkstns | Number (0d) | R | V | Y | |
| Unit Status | Text | I | V | N | Rows added to the spreadsheet must have a valid Occupancy Status specified |
| Hierarchy | Text | R | V | N | |
| Company and Cost Center assignment (Co/CC) | Text | I | V | N | Rows added to the spreadsheet must have a valid Company and Cost Center assignment specified |
| Existing SF as of Jul. 1, 2007 | Number (0d) | R | V | Y | |
| 07-[Year-1] | Number (0d) | DE | V | Y | Blank cells will be treated the same as zeros, typical for "Number" Data Entry fields Note: July 2007 thru December 2008 columns contain Actual SF totals inclusive of any Group Sharing in Drawing-based Zones. |
| 08-[Year-1] | Number (0d) | DE | V | Y | |
| 09-[Year-1] | Number (0d) | DE | V | Y | |
| 10-[Year-1] | Number (0d) | DE | V | Y | |
| 11-[Year-1] | Number (0d) | DE | V | Y | |
| 12-[Year-1] | Number (0d) | DE | V | Y | |
| 01-[Year] | Number (0d) | DE | V | Y | |
| 02-[Year] | Number (0d) | DE | V | Y | |
| 03-[Year] | Number (0d) | DE | V | Y | |
| 04-[Year] | Number (0d) | DE | V | Y | |
| 05-[Year] | Number (0d) | DE | V | Y | |
| 06-[Year] | Number (0d) | DE | V | Y | |
| 07-[Year] | Number (0d) | DE | V | Y | |
| 08-[Year] | Number (0d) | DE | V | Y | |
| 09-[Year] | Number (0d) | DE | V | Y | |
| 10-[Year] | Number (0d) | DE | V | Y | |
| 11-[Year] | Number (0d) | DE | V | Y | |
| 12-[Year] | Number (0d) | DE | V | Y | |
| Notes/Reason for Move | Text | DE | V | N | Limited to 255 char We are storing the contents of the Notes field upon import, so that this information is not lost upon export. We are only storing it in a table in the event the building restack group is exported again. There is |

TABLE 1-continued

Definition of Data Columns

| Name | Format | For Reference (R), Visible (V) Indexing(I), or Data Entry(DE) | Visible (V) or Hidden (H) | Calculated SUMS in Summation Rows* | Comments |
|---|---|---|---|---|---|
| | | | | | no visibility into the information within the Custom UI and is being provided only as a convenience to the Bank. |

The Calculated Sums in Summation Rows are provided to facilitate the planning process, however, depending on how rows are added and deleted these sums may become inaccurate. Sums may be changed, deleted or recreated to serve the needs of the planning process. The building summation row might not be populated for buildings that have more than 30 floors due to a limitation in some commercially available spreadsheet software.

As used above, "Hierarchy" may refer to an organization's internal classification structure of cost centers or departments. One illustrative hierarchy may include ten levels in the hierarchy, each level referred to as a "dot" (1 dot, 2 dot, and the like). "Unit Status," in one embodiment, may include Occupied (OCC), Vacant Big Deal (VBD), Vacant Client Committed (VCC), Vacant Disposable (VDP), Vacant LT (VLT), Vacant Landlord Issues (VLS), Vacant Non-Disposable (VND), Vacant Pending Classification (VPC), Vacant Reserved for Backfill (VRB), Vacant Closed Transaction (VCT), Vacant BD2 Space (VB2).

Table 2 defines the structure of the data rows with the XML spreadsheet template file. The template contains summation rows to facilitate the planning process. The exported file may optionally be saved with the summation rows hidden. Depending on the preference of the planner, these rows can remain hidden or unhidden. The summation rows are simply for reference and might not impact the import process regardless of whether they are hidden or unhidden. All data rows contain all necessary information for reference purposes even if the summation rows are hidden. In one embodiment of the invention, the zone must be unique, i.e., identified as belonging to a particular floor and building. The building summation row might not be populated for buildings that have more than 30 floors due to a limitation in the commercially available spreadsheet software.

TABLE 2

Definition of Data Rows

| Name | Summation(S) or Data(D) | Visible(V) or Hidden(H) | Shading |
|---|---|---|---|
| Building Example 1 | S | H | Light Blue |
| Floor Example 1 | S | H | Light Green |
| Zone Example 1 | S | H | Light Yellow |
| Occupancy Status/Co/CC Combo 1 | D | V | None |
| Occ Status/Co/CC Combo 2 | D | V | None |
| Zone Example 2 | S | H | Light Yellow |
| Occ Status/Co/CC Combo 1 | D | V | None |
| Occ Status/Co/CC Combo 2 | D | V | None |
| Floor Example 2 | S | H | Light Green |
| Zone Example 3 | S | H | Light Yellow |
| Occ Status/Co/CC Combo 1 | D | V | None |
| Occ Status/Co/CC Combo 2 | D | V | None |
| Zone Example 4 | S | H | Light Yellow |
| Occ Status/Co/CC Combo 1 | D | V | None |
| Occ Status/Co/CC Combo 2 | D | V | None |

An illustrative restack process will now be illustrated with reference to FIG. 9 and FIG. 10. FIGS. 9A-9D, referred to together as FIG. 9, collectively represent an illustrative snapshot of the first 38 rows of a spreadsheet exported according to an embodiment of the invention described herein, with columns E-G hidden because they represent merely descriptive data of the complex name, address, and city. As illustrated in row 2, building level information is shaded a first color or texture, e.g., light blue. As illustrated in rows 3, 20, and 24, floor level information is shaded in a second color or texture, e.g., light green. As illustrated in rows 4, 7, 9, 11, 13, 15, 16, 18, 21, and 25, zone level information is shaded in a third color or texture, e.g., light yellow. Zone location information remains unshaded. Zones may refer to divisible or atomic locations, e.g., as illustrated in column AD, which indicates that some zones include one space, and some zones include more than one space.

Rows 21-23 are used for illustration in this example, and these rows have been enclosed in a broken line bounding box for easy identification in FIG. 9. Rows 21-23 illustrate that the first floor (col. I) includes zone A0A0 (col. P), which comprises 20,074 square feet (col. Q). Rows 21-23 further illustrate that the first floor is presently split between two Co/CC (Cost Centers), i.e., XXX/XXXXXXX and XXX/YYYYYYY, each of which occupies one of the two spaces on the first floor. The '240 CC occupies 17,338 sf (cell AF:22), whereas the '006 CC occupies 2,736 sf (cell AF:23).

Figure 10:
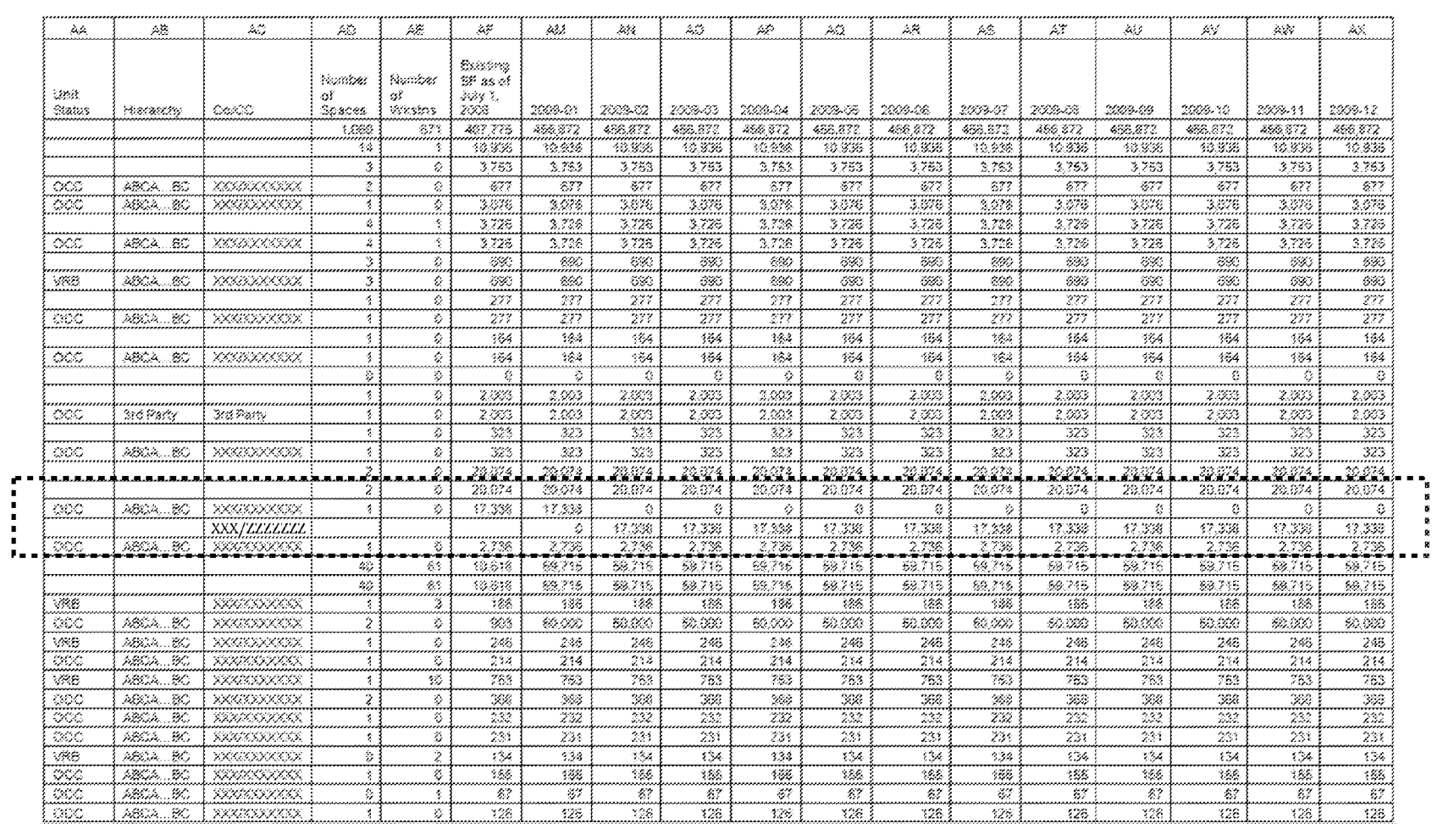

FIG. 10 illustrates edits made by a user to indicate a restacking of the first floor beginning in the second period of the 2009 plan year, i.e., in 2009-02 (cells AN:22-23). In FIG. 10, the user has inserted a new row between original rows 22 and 23, and edited the space allocation information in columns AM-AX for new rows 22-23. Columns AG-AN are hidden in FIG. 10 because they represent unchanged data from FIG. 9. Upon importing the data illustrated in FIG. 10 back into the enterprise real estate software, zone A0A0 will be reallocated to cost center XXX/ZZZZZZZ beginning in the second planning period for 2009.

Figure 12B:
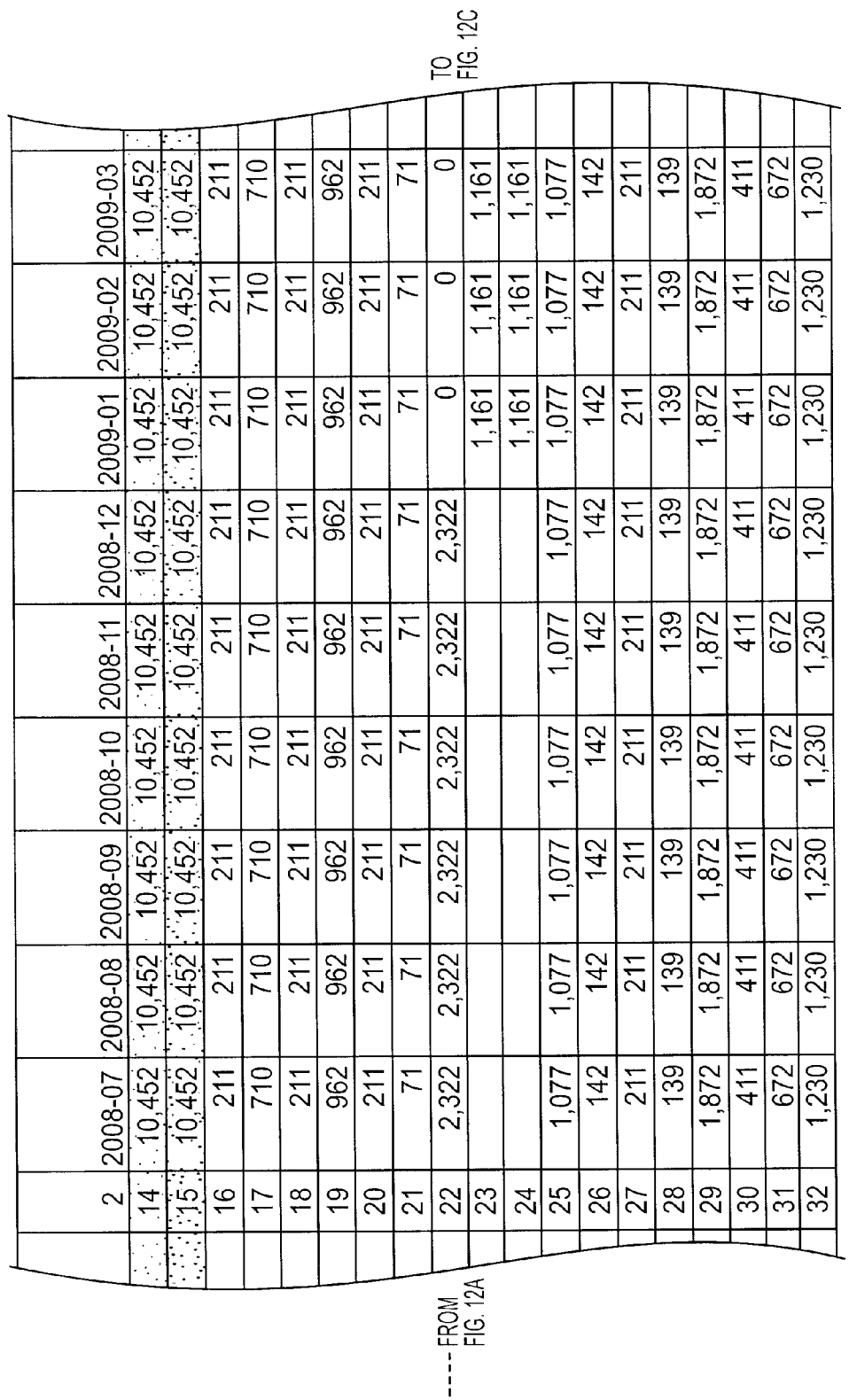

While the above illustration is simple insofar as only one space on one floor has been restacked, more complex restacking operations are also possible. For example, with respect to FIGS. 11 and 12, a zone may be reassigned from one subdivision to multiple subdivisions during one planning period for some period of time, and then reassigned wholly to one of the multiple subdivisions during a second planning period. FIGS. 11A-11C, referred to together as FIG. 11, collectively illustrates that the zone corresponding to row 22 is presently assigned to Co/CC XXX/VVVVVVV. In FIGS. 12A-12C, referred to together as FIG. 12, the user has adjusted the data by inserting two new rows immediately subsequent to row 22, i.e., new rows 23 and 24, and has split the zone from row 22 among two new cost centers, XXX/TTTTTTT and XXX/

RRRRRRR, each of which will be occupying 1,161 square feet of the zone beginning in January 2009. The user has further indicated that beginning in July 2009 cost center XXX/TTTTTTT will occupy all 2,332 square feet of the zone. This, it is apparent that zones having multiple spaces may be split among existing cost centers, split among existing and new cost centers, or moved completely to new cost centers. In addition, restacking may be performed over multiple planning periods, and are not limited to restacking during only a single planning period. The use of XXX/XXXXXXX is for illustrative purposes only. Cost centers may differ, despite being represented generically as XXX/XXXXXXX.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
preparing restack data from a space management database for export by grouping records corresponding to atomic locations based on a commonality of location of each atomic location;
exporting the restack data for editing by a user, wherein the exported data is exported to a file stored in a second format different from a first format usable by the space management database;
receiving user input comprising edits to the file storing the restack data to indicate a move by one or more subdivisions of an organization within the organization's space under management;
importing the edited restack data back into the space management database by importing the file into the database; and
applying the edited restack data to a plurality of plan periods for one or more locations as defined by the edited restack data,
wherein the commonality of location comprises a common zone among a plurality of atomic locations,
wherein the common zone represents a portion of a floor of a building,
wherein the floor comprises multiple zones, and
wherein the entire floor is occupied by a same organization.

2. The method of claim 1, wherein the commonality of location comprises a common divisible location in which each of a plurality of atomic locations are located.

3. The method of claim 1, wherein the restack data comprises a plurality of planning periods.

4. The method of claim 3, wherein the plurality of planning periods comprise one planning period per restack period for a planning year.

5. The method of claim 3, wherein the planning periods comprise one planning period per restack period from a predetermined time up to the beginning of a planning year.

6. The method of claim 1, wherein the exported restack data comprises spreadsheet data.

7. The method of claim 6, wherein the edited restack data comprises a row inserted into the spreadsheet by the user, wherein the row indicates a cost center and an amount of square feet to be assigned to the cost center for one or more of a plurality of planning periods.

8. The method of claim 7, wherein the row corresponds to a zone, a floor, and a building in which the square footage is located.

9. The method of claim 6, wherein exporting the restack data comprises populating current space management data into a plurality of planning periods within the spreadsheet data.

10. The method of claim 1, wherein grouping records further comprises grouping atomic locations based on a commonality of subdivision assignment and occupancy status.

11. One or more computer readable non-transitory storage media storing computer executable instructions that, when executed, cause a processing system to perform a method comprising:
preparing restack data stored in a space management database for export by grouping records corresponding to atomic locations based on a commonality of location of each atomic location;
exporting the restack data for editing by a user, wherein the exported data is exported to a file stored in a second format different from a first format usable by the space management database;
importing edited restack data from the file back into the space management database, said edited restack data comprising user input indicating edits to the file storing the restack data to indicate a move by one or more subdivisions of an organization within the organization's space under management; and
applying the edited restack data to a plurality of plan periods for one or more locations as defined by the edited restack data,
wherein the commonality of location comprises a common zone among a plurality of atomic locations,
wherein the common zone represents a portion of a floor of a building,
wherein the floor comprises multiple zones, and wherein the entire floor is occupied by a same organization.

12. The computer readable storage media of claim 11, wherein the commonality of location comprises a common divisible location in which each of a plurality of atomic locations are located.

13. The computer readable storage media of claim 11, wherein the restack data comprises a plurality of planning periods.

14. The computer readable storage media of claim 13, wherein the plurality of planning periods comprise one planning period per restack period for a planning year.

15. The computer readable storage media of claim 13, wherein the planning periods comprise one planning period per restack period from a predetermined time up to the beginning of a planning year.

16. The computer readable storage media of claim 11, wherein the exported restack data comprises spreadsheet data.

17. The computer readable storage media of claim 16, wherein the edited restack data comprises a row inserted into the spreadsheet by the user, wherein the row indicates a cost center and an amount of square feet to be assigned to the cost center for one or more of a plurality of planning periods.

18. The computer readable storage media of claim 17, wherein the row corresponds to a zone, a floor, and a building in which the square footage is located.

19. The computer readable storage media of claim 16, wherein exporting the restack data comprises populating current space management data into a plurality of planning periods within the spreadsheet data.

20. The computer readable storage media of claim 11, wherein grouping records further comprises grouping atomic locations based on a commonality of subdivision assignment and occupancy status.

* * * * *